(12) United States Patent
Mitsutake

(10) Patent No.: US 9,749,493 B2
(45) Date of Patent: Aug. 29, 2017

(54) IMAGE READING APPARATUS THAT ILLUMINATES AN ORIGINAL AND READS AN IMAGE OF THE ORIGINAL

(71) Applicant: CANON KABUSHIKI KAISHA, Tokyo (JP)

(72) Inventor: Ikutaro Mitsutake, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/160,169

(22) Filed: May 20, 2016

(65) Prior Publication Data

US 2016/0352953 A1 Dec. 1, 2016

(30) Foreign Application Priority Data

May 25, 2015 (JP) ................................. 2015-105270

(51) Int. Cl.
*H04N 1/024* (2006.01)
*H04N 1/00* (2006.01)
*H04N 1/04* (2006.01)

(52) U.S. Cl.
CPC ..... *H04N 1/02409* (2013.01); *H04N 1/00795* (2013.01); *H04N 1/0443* (2013.01); *H04N 2201/0081* (2013.01)

(58) Field of Classification Search
None
See application file for complete search history.

(56) References Cited

U.S. PATENT DOCUMENTS

2007/0291326 A1* 12/2007 Morita ................. H04N 1/1013
358/474

FOREIGN PATENT DOCUMENTS

| JP | 2002-202567 A | 7/2002 |
|---|---|---|
| JP | 2004-228706 A | 8/2004 |
| JP | 2013-236286 A | 11/2013 |
| JP | 2013236286 A * | 11/2013 |

* cited by examiner

*Primary Examiner* — Andrew H Lam
(74) *Attorney, Agent, or Firm* — Carter, DeLuca, Farrell & Schmidt, LLP

(57) ABSTRACT

An image reading apparatus according to the present invention is an image reading apparatus including a reading unit that illuminates an original and reads an image of the original, wherein the apparatus can execute a first mode of reading the image of the moving original while the reading unit is kept stationary, and a second mode of reading the image of the stationary original while moving the reading unit, the apparatus further includes a light condensing unit that refracts a light flux from the reading unit and condenses the light flux on the original in the first mode, and the light flux from the reading unit incidents on the original without passing through the light condensing unit in the second mode.

16 Claims, 7 Drawing Sheets

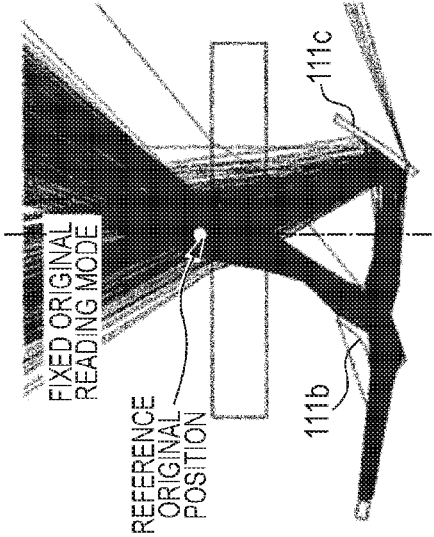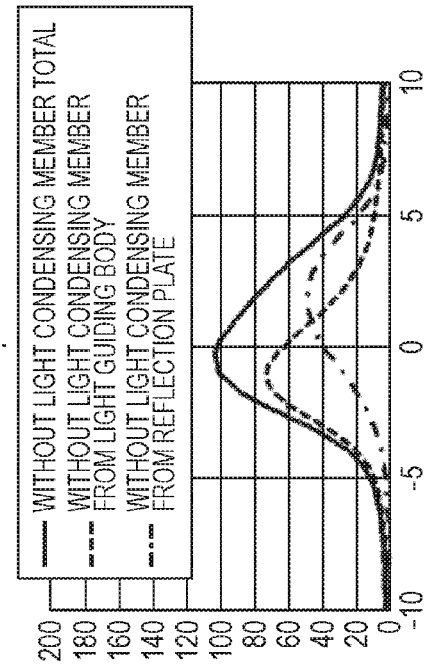
FIG. 4A
FIG. 4B

IMAGE READING APPARATUS THAT ILLUMINATES AN ORIGINAL AND READS AN IMAGE OF THE ORIGINAL

BACKGROUND OF THE INVENTION

Field of the Invention

The present invention relates to an image reading apparatus, more particularly, to apparatuses that illuminate a surface of an original and read an image according to a line-sequential scheme; the apparatuses include image scanners, copiers, and facsimiles.

Description of the Related Art

Conventionally, a light illuminating device (an original illuminating device) used in an image reading apparatus, such as an image scanner, which illuminates a surface of an original and reads an image according to the line-sequential scheme, guides light from a light source to the surface to be illuminated, and thus illuminates a reading target area (reading line) at a desired illumination intensity. Accordingly, a read image with a low noise is obtained.

Known line-sequential schemes for reading include a scheme of reading an original placed on what is called platen glass while moving a reading unit, and a scheme of reading through a fixed reading unit while moving an original (hereinafter, called feeding-reading). A mechanism called an ADF (Auto Sheet Feeder) or a sheet feed is used for feeding-reading.

In general, in the case of copying a large amount of originals at high speed, the originals are conveyed at high speed while being read. To read the original moving at high speed, the accumulation time at a light receiving element is required to be set short with respect to the speed for feeding the original. To reduce increase in noise according to this setting, a bright F-number is required to be adopted for the reading optical system, or the number or output of light sources is required to be increased, for example.

However, such a configuration is an overdesigned one for a fixed original reading mode. In the fixed original reading mode, the original is replaced for each time of reading. Improvement in speed is not so effective in such situations.

Here, according to Japanese Patent Application Laid-Open No. 2013-236286, a configuration is known where double-structured reflection plates (a first and a second reflection plate) are provided in the clearance between a light source unit and a platen, to increase the amount of illumination onto the surface of the original during feeding-reading. In Japanese Patent Application Laid-Open No. 2013-236286, in the fixed original reading mode, only the second reflection plate remote from the platen is moved integrally with a scanning unit (carriage), to prevent contact with the integrally moving carriage due to deformation of the platen unit caused by the weight of a book or the like.

However, even if the reflection plate is provided in the clearance between the light source unit and the platen to increase the amount of illumination onto the platen during feeding-reading as described in Japanese Patent Application Laid-Open No. 2013-236286, the effect is small for the case with a small light beam leakage at the position.

SUMMARY OF THE INVENTION

The present invention has an object to provide an image reading apparatus that can achieve high-speed reading by effectively illuminating an original reading position in a reading optical axis direction at a high illumination intensity when reading an image of a moving original.

An image reading apparatus according to the present invention is an image reading apparatus including a reading unit that illuminates an original and reads an image of the original, wherein the apparatus can execute a first mode of reading the image of the moving original while the reading unit is kept stationary, and a second mode of reading the image of the stationary original while moving the reading unit, the apparatus further includes a light condensing unit that refracts a light flux from the reading unit and condenses the light flux on the original in the first mode, and the light flux from the reading unit incidents on the original without passing through the light condensing unit in the second mode.

Further features of the present invention will become apparent from the following description of exemplary embodiments with reference to the attached drawings.

BRIEF DESCRIPTION OF THE DRAWINGS

FIGS. 4A and 4B are diagrams illustrating an advantageous effect according to the first embodiment.

DESCRIPTION OF THE EMBODIMENTS

Preferred embodiments of the present invention will now be described in detail in accordance with the accompanying drawings.

First Embodiment (Image Reading Apparatus)

Figure 1:
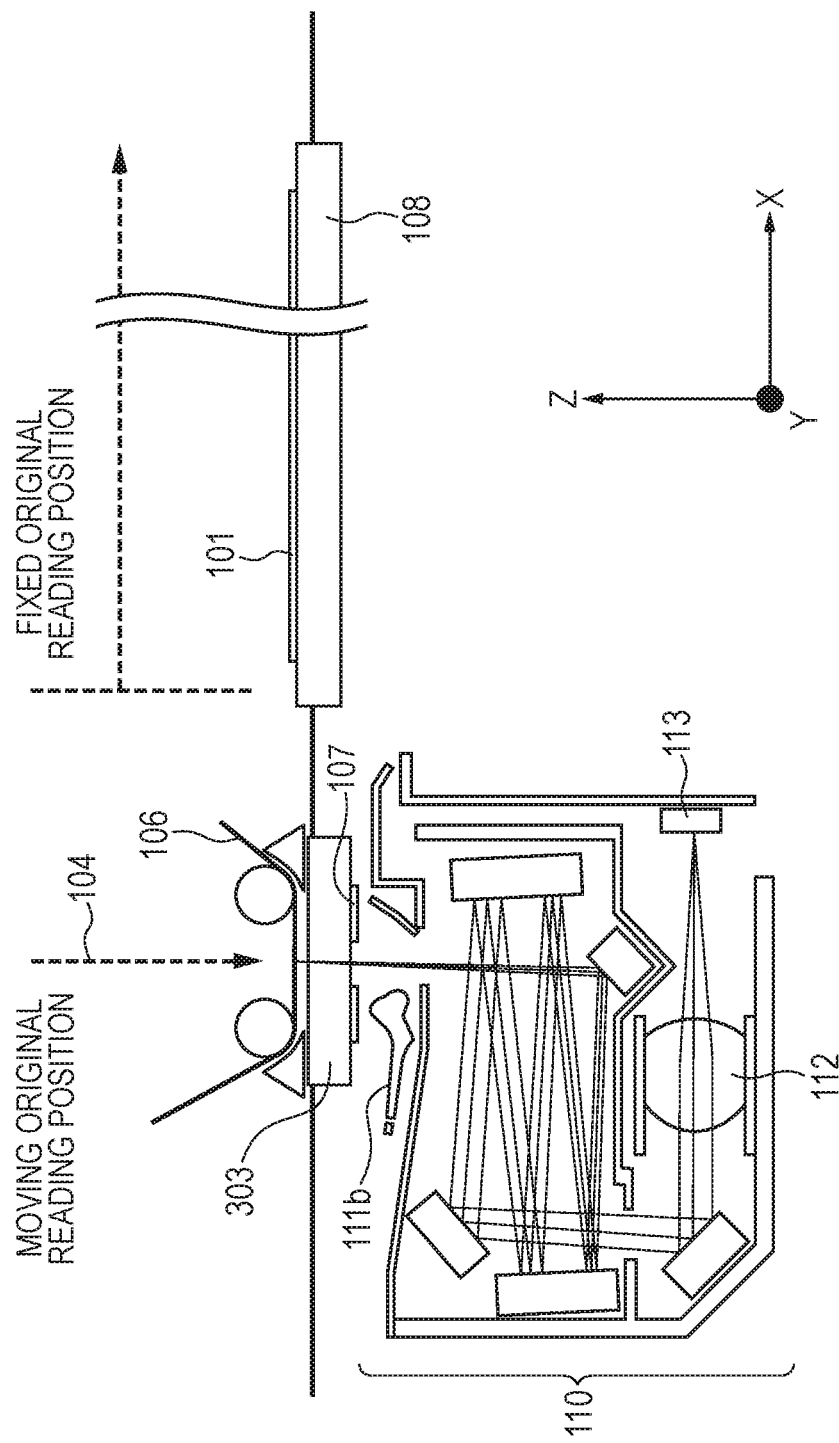
FIG. 1 is a schematic diagram of an image reading apparatus on which a light illuminating device according to a first embodiment of the present invention is mounted.

FIG. 1 is a schematic diagram of a principal part of an image reading apparatus on which a light illuminating device according to a first embodiment of the present invention is mounted. In this embodiment, two types of image reading modes are available. The first mode is a moving original reading mode (feeding-reading), and the second mode is a fixed original reading mode (the original is stationary).

Here, in the Description of the present application, a "main scanning direction", a "sub-scanning direction", a "main scanning section" and a "sub-scanning section" are defined as follows. That is, the main scanning direction is a Y direction (first direction), which is the longitudinal direction of a light guiding body 111b serving as a first optical unit. The sub-scanning direction is an X direction (the moving direction of a reading unit 110 in the second mode, this moving direction intersecting with the first direction; a second direction). The reading optical axis direction is a Z direction. The main scanning section is a YZ section (a cross-section including the main scanning direction and a moving direction of the original). The sub-scanning section is a ZX section (a cross-section including the sub-scanning direction, the moving direction of the original, and the reading optical axis direction).

In FIG. 1, in the first mode, the reading unit 110 reads an image of an original 106 that moves in a direction intersecting with the first direction, for a reading target area, which is long in the first direction. The reading unit 110 includes the light guiding body 111b which serves as the first optical unit and is made of a transparent material constituting a part of the light illuminating device (light illuminating unit), and a light condensing unit 107 serving as a second optical unit, described later in detail. The reading unit 110 further includes an imaging optical system 112, and a light receiving element 113 serving as a reading element.

In the second mode, the reading unit 110 is displaced from the moving original reading position 104 to the fixed original reading position, thus integrally moving the reading unit 110 in the X direction with respect to a fixed reading target. That is, in the second mode of this embodiment, the original 101 fixedly placed on the platen glass 108 is illuminated by the light illuminating device (light illuminating unit) including the light guiding body 111b, and light is received through the imaging optical system 112 and by the light receiving element (reading element) 113 which is a line sensor long in the first direction. The reading unit 110 is then moves (scans) in the sub-scanning direction (X direction), and reads an image of the moving original in a line-sequential manner.

Image information thus read in the first and second modes is transmitted through an interface, not illustrated, to an internal image processor or an external apparatus, such as a personal computer.

(Light Illuminating Device)

Figure 2:
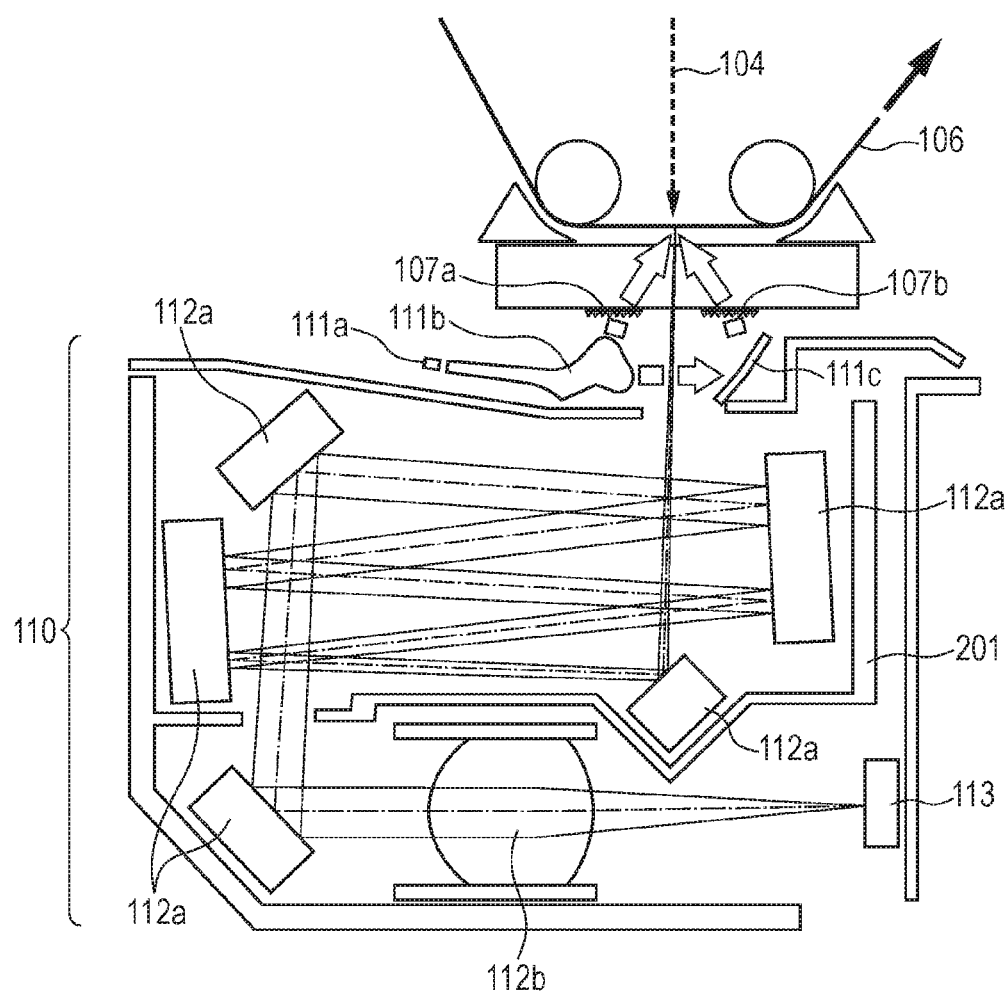
FIG. 2 is a diagram illustrating a reading unit according to the first embodiment.

Here, the reading unit 110 during feeding-reading (first mode) is described in detail with reference to FIG. 2. FIG. 2 is a schematic diagram of a principal part of the image reading apparatus on which the light illuminating device (light illuminating unit) according to this embodiment is mounted, during feeding-reading. In the case of feeding-reading, the reading unit 110 is displaced (moved) from the fixed original reading position to the moving original reading position 104. Consequently, fixed light condensing units (prisms) 107a and 107b are positioned between the light guiding body 111b and the moving original 106.

In this embodiment, the light illuminating device (light illuminating unit) further includes a light source 111a, and an opposite reflection plate 111c serving as a reflection unit, besides the light guiding body 111b. A plurality of LEDs (Light Emission Diodes) arranged in the main scanning direction (first direction) are adopted as the light source 111a. Light fluxes emitted from the light source 111a enter the light guiding body 111b, are repeatedly reflected in this body, and are emitted. With some of the fluxes, the original reading position is directly illuminated.

Others of the fluxes are transmitted toward the opposite reflection plate 111c disposed across the optical axis (reading optical axis) of the imaging optical system, and is reflected by the opposite reflection plate 111c, thereby allowing the original reading position to be illuminated in a direction opposite to the illumination direction in which the original is directly illuminated. Thus, the opposite reflection plate 111c is provided on a side opposite to the direction in which the light guiding body 111b is arranged, with respect to a direction perpendicular to the original.

Such illumination onto the original reading position in the direction sandwiching the reading optical axis with the illustrated section is to prevent a shade from being caused in the case where, for example, pasted thick paper forms a step or the case of a part where the height of the original is locally changed, such as a bound part of a book.

In this embodiment, the imaging optical system 112 accommodated in a casing 201 includes folding mirrors 112a and an imaging lens 112b. The optical path is folded by the folding mirrors 112a, and the imaging lens 112b forms an image of the reading target area of the original, on the light receiving element 113 which is a line CMOS sensor. The light receiving element 113 then digitally outputs the brightness of the received image. For example, this unit line-sequentially outputs a color image, based on the intensity values of red, green and blue in the case of, for example, an RGB color sensor, and on the intensity value obtained by reading a white reference plate, not illustrated, before actual reading.

(Comparison Between First and Second Modes)

1) Adjustment to High-Speed Reading

To read an image of an original at high speed, the original to be conveyed in the moving original reading mode (first mode) and the reading unit in the fixed original reading mode (second mode) are required to be moved faster. In general, in the case of reading a plurality of originals, the feeding-reading (first mode) is used. In this mode, the original is not required to be changed each time. The speed of the reading process can be improved by increasing the speed of conveying the original.

Here, to achieve a constant image resolution in situations where the original and the reading unit (light receiving element) relatively move at high speed with respect to each other, the accumulation time at the light receiving element, which corresponds to the shutter speed, is required to be reduced. Consequently, the energy of light that is receivable by the light receiving element in a unit time becomes relatively low. If the energy of receivable light is small, the significance of noise components cannot be relatively ignored, which might cause reduction in image quality.

The noise components may be various ones due to, for example, the dark current at the sensor element and the crosstalk between pixels. The recent technical advance has significantly reduced these noises. However, reduction in the received energy serving as a signal component makes the noises relatively conspicuous, thereby causing reduction in image quality. To reduce the reduction in image quality, measures are taken that mount a light illuminating device having relatively high output on the image reading apparatus for reading an original at high speed and illuminate the original more brightly to cause an image in the reading target area projected onto the light receiving element to be brighter. Alternatively, other measures are taken that mount an imaging optical system having a brighter F-number.

However, it is easier to adjust the output of the light illuminating device by, for example, increasing the output and the number of light sources than setting F-numbers of imaging optical systems for respective models and developing multiple types of imaging lenses. That is, for adjustment to high-speed reading, increase in amount of light from the light illuminating device in the first mode is practical.

2) The Magnitude of Amount of Deviation (Amount of Warpage) at the Original Reading Position in the Reading Optical Axis Direction The required illumination characteristics are different in some degree between the moving original reading (first mode) for reading an original being conveyed and the fixed original reading (second mode) for reading an original mounted on the platen. In the fixed original reading (second mode), an object, such as a book or a three-dimensional object, whose surface to be read is not always positioned at a reference original height adjacent to the platen glass and is apart (warping above) from the reading unit is sometimes read. Consequently, the illumination is required to reach the warping original.

Meanwhile, in the moving original reading (first mode), the original being conveyed by the conveyance rollers is read. Consequently, the spacing between the original and the reading unit has an error to the extent of the thickness of the original being conveyed (the original is moved in situations regulated in the reading optical axis direction). It is not required to illuminate a wide range in the warpage direction (a direction away from the reference original position in the reading optical axis direction).

Consequently, in the fixed original reading (second mode), the illumination area which is wide in the warpage direction is kept uniform as much as possible. Meanwhile, in the moving original reading mode (first mode), it is desirable to illuminate the position for reading an original without warpage at a high illumination intensity as much as possible.

(Light Condensing Units 107a and 107b)

To illuminate the position for reading the original without warpage at a high illumination intensity as much as possible in the moving original reading mode (first mode), the fixed light condensing unit 107a is provided as the second optical unit that condenses the light flux on the reading position. The fixed light condensing unit 107b is provided as a fourth optical unit that condenses, on the reading position, the light flux reflected by the opposite reflection plate 111c serving as a third optical unit provided on a side opposite to the light guiding body 111b across the reading optical axis.

Figure 3:
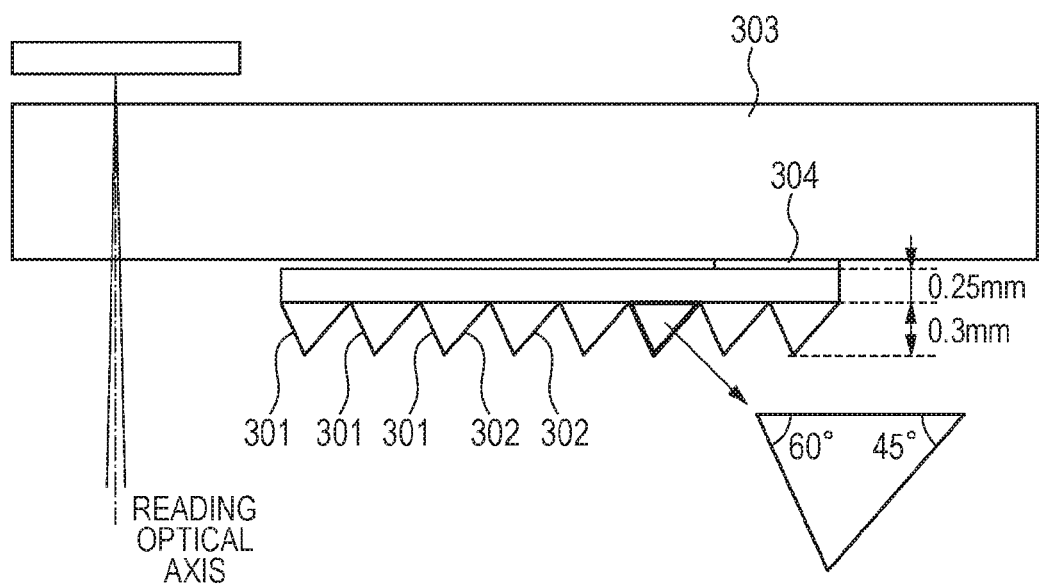
FIG. 3 is a diagram illustrating each prism which serves as a light condensing unit according to the first embodiment.

These units are described in further detail with reference to FIG. 3. The light condensing units 107a and 107b of this embodiment are provided so as to arrange their saw-toothed shapes (a plurality of lens elements) similar to those of a Fresnel lens in the sub-scanning section, and extend along the main scanning direction (first direction), which is the direction perpendicular to the sheet surface. Each prism shape in the sub-scanning section is designed so as to refract a passing light flux to approach the reading optical axis.

In each prism serving as a light condensing element, a wall surface 301 nearer to the reading optical axis and a wall surface 302 farther to the reading optical axis are substantially linearly inclined, forming angles 60° and approximately 45°, respectively, toward the reading optical axis. It is desired to appropriately configure the inclined angles of each prism in conformity with the principal angle of the passing light beam. In general, it is considered that the prism apart from the reading optical axis be configured to have an inclined angle so as to refract the light flux to approach the reading optical axis.

It is herein assumed that the Fresnel lens, which serves as the light condensing unit, has a thickness T (mm) in the reading optical axis direction.

It is desired to satisfy the following conditional expression (larger than 0.5 mm and smaller than 5 mm).

$$0.5 < T < 5$$

In this embodiment, a prism having a height of approximately 0.3 mm (the total thickness T is approximately 0.55 mm) is formed on a tabular base part having a thickness of 0.25 mm which is a reference for forming the prism at the inclined angle described above. The prism is configured to have an appropriate inclined angle in conformity with the characteristics of the light illuminating device. Each prism serving as the light condensing element is formed by injection molding using an acrylic resin (with a refractive index of approximately 1.49).

Each prism, which serves as the light condensing element, has a substantially same length in the main scanning direction (first direction) with respect to the light guiding body 111b and the opposite reflection plate 111c. Each prism is fixed (adhered) with double-sided adhesive tape 304 onto a surface opposite to the reading position (the movement surface of the original) of feeding-reading glass 303 serving as a glass base for supporting the moving original around an end farthest from the reading optical axis. The other light condensing unit 107b has a shape where the shape of the light condensing unit 107a is reversed about the reading optical axis.

The prisms thus have a continuous Fresnel-lens shape. If the shape were achieved using a single prism, the light condensing unit would become thick in the reading optical axis direction to cause fears of interference with the moving light illuminating device (light illuminating unit). The continuous Fresnel-lens shape is adopted to avoid such fears.

If the original and the light illuminating device (light illuminating unit) were set away from each other, the apparatus might increase in size and the illumination efficiency might decrease because a farther original should be illuminated. In general, a clearance of approximately 5 mm between the platen glass and the light illuminating device (light illuminating unit) is provided in consideration of the distortion of the platen glass. The light condensing member is required to be accommodated in the clearance.

If the light condensing member would be disposed close to the original serving as the illumination target, a refracted light flux would reach the original before sufficiently approaching the reading optical axis, thereby reducing the condensing efficiency. If the refractive power were strong, or the inclined angle of the inclined surface 302 were large, to prevent this reduction, then the incident refracted light flux would enter the surface opposite to the inclined surface 302 at an angle which is equal to or larger than the critical angle and could not pass owing to total reflection. Consequently, the light condensing units 107a and 107b of this embodiment are provided at a lower part (the side adjacent to the reading unit) of the feeding-reading glass, and the position is approximately 5 mm apart from the original.

(Comparison Between Light Fluxes in First and Second Modes)

FIGS. 4A and 4B illustrate comparison between the feeding-reading (first mode) and the fixed original reading mode (second mode), in the optical path of the representative light beam in the original illuminating light flux, and in the distribution of the amount of light (illumination intensity) on the original.

In general, in the case of the fixed original reading mode (second mode), it is desired to satisfy the following expression, where it is assumed that the illumination intensity at the reference position is $I_0$, and the illumination intensity on the reading target 10 mm apart in the reading optical axis direction from the reference position and the light receiving element is $I_1$.

$$I_1/I_0 > 0.4$$

As can be understood from FIGS. 4A and 4B, the light beam from the light guiding body 111b and the opposite reflection plate 111c is refracted so as to pass in proximity to the reference original position (position of fixed original), in the moving original reading mode (first mode), unlike the fixed original reading mode (second mode).

As a result, at the reference original position in the moving original reading mode (first mode), increase in illumination intensity by approximately 60% is achieved, in comparison with the fixed original reading mode (second mode) without the light condensing units 107a and 107b. In the second mode, the peaks of the illumination intensities from the right and left illumination systems to illuminate the warping original are offset on the surface at the reference original position. On the other hand, in the first mode, light is condensed onto the reference original position (reading position) by the light condensing units 107a and 107b. The increase in illumination intensity is achieved by this condensation.

The increase in illumination intensity of approximately 60% in the feeding-reading mode (first mode) indicates capability of speed increase by 60% in comparison with the fixed original reading mode (second mode). For example, it is indicated that even with an image reading apparatus that conventionally supports reading about 30 sheets per minute, use of the light condensing units 107a and 107b allows this apparatus to achieve reading about 48 sheets in feeding-reading.

(Feeding-Reading of Both Sides of Original)

Figure 5:
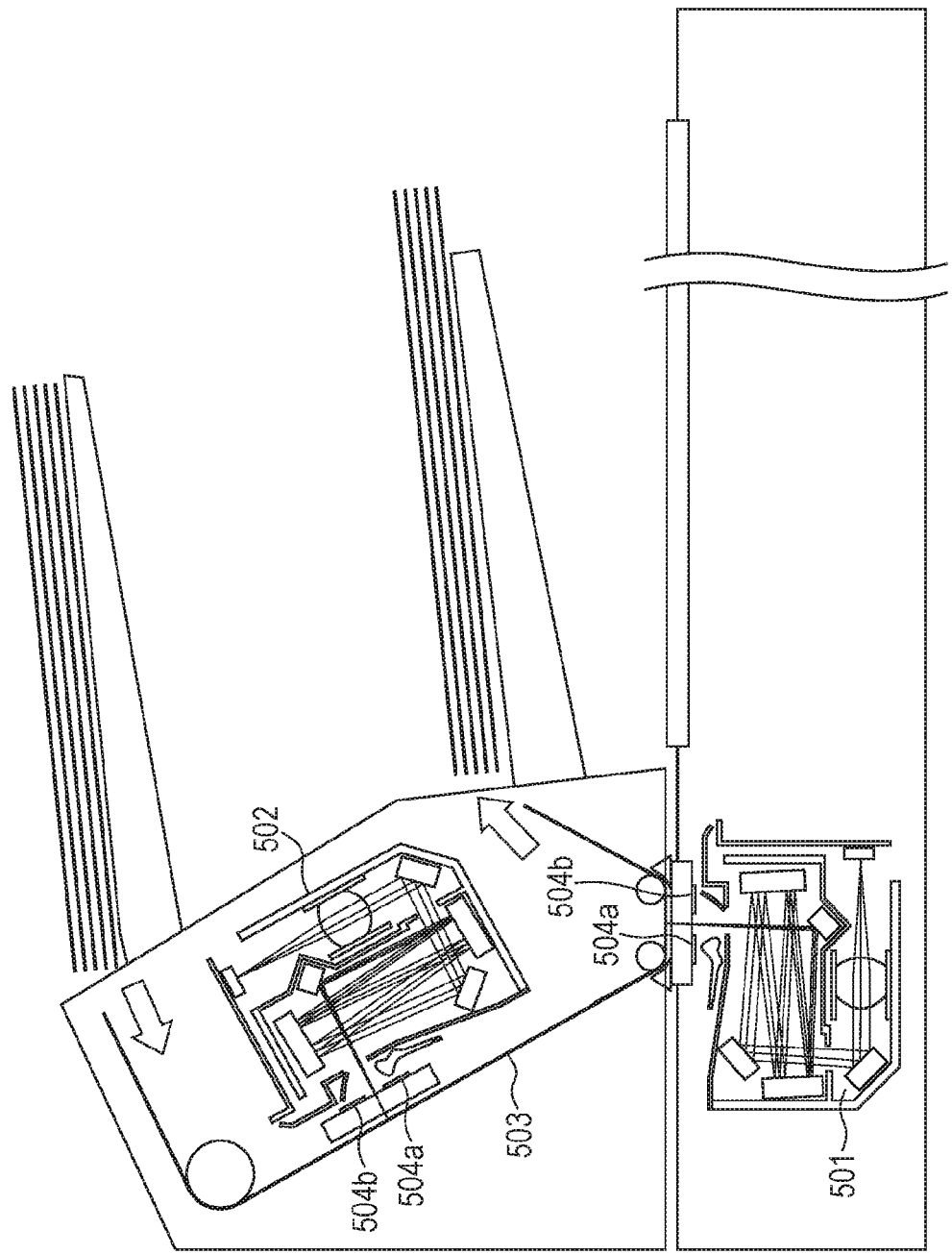
FIG. 5 is a diagram illustrating double-sided image reading according to the first embodiment.

FIG. 5 illustrates a configuration for reading both the sides (the front surface and the rear surface) of an original at the same time in the feeding-reading (first mode). FIG. 5 illustrates a first reading unit 501 that reads the front surface of the original, a second reading unit 502 that reads the rear surface of the original, and the original 503.

As illustrated in FIG. 5, in the case of reading both the sides of the original through the two reading units, reading is desired to be performed through the same reading unit configuration as much as possible, to uniform the image qualities. For example, it is not suitable that an optical reduction system is adopted for the first reading unit, while CIS (Contact Image Sensor) is adopted for the second reading unit. In the CIS, lens elements which are erect same-magnification optical systems are arranged in an array. Not only the spectral transmittance characteristics and the resolution of the optical system but also the difference in image quality due to the characteristics of the light illuminating devices is sometimes unignorable.

In this embodiment, the first and second reading units adopt the same reading unit configuration. Also on the rear surface, the amount of light during feeding-reading is increased to facilitate speed improvement. Consequently, light condensing units 504a and 504b, which are equivalent to the light condensing units 107a and 107b, are arranged between the original on the side nearer to the second reading unit and this second reading unit.

More specifically, the second reading unit includes: a light guiding body that serves as a fifth optical unit and emits, toward the rear surface, a light flux having been emitted from the light source; and a light condensing unit 504a that serves as a sixth optical unit and refracts the light flux having emitted from the light guiding body and condenses the flux onto the reading position on the rear surface. This unit further includes: a reflection unit that serves as a seventh optical unit and is provided on a side opposite to the light guiding body across the reading optical axis; and the light condensing unit 504b that serves as an eighth optical unit and refracts the light flux having been reflected by the reflection unit and condenses the flux on the reading position on the rear surface.

As described above, the image reading apparatus of this embodiment can obtain a higher illumination intensity on the surface of the original in the feeding-reading (first mode) while keeping the image quality in the fixed original reading mode (second mode). Consequently, the low-cost and energy saving image reading apparatus can be provided without increasing the load on the light source and the power consumption.

VARIATION EXAMPLES

Desirable embodiments of the present invention have thus been described above. The present invention is not limited to these embodiments, and can be variously modified and changed within an extent of the gist of the invention.

Variation Example 1

Figure 6:
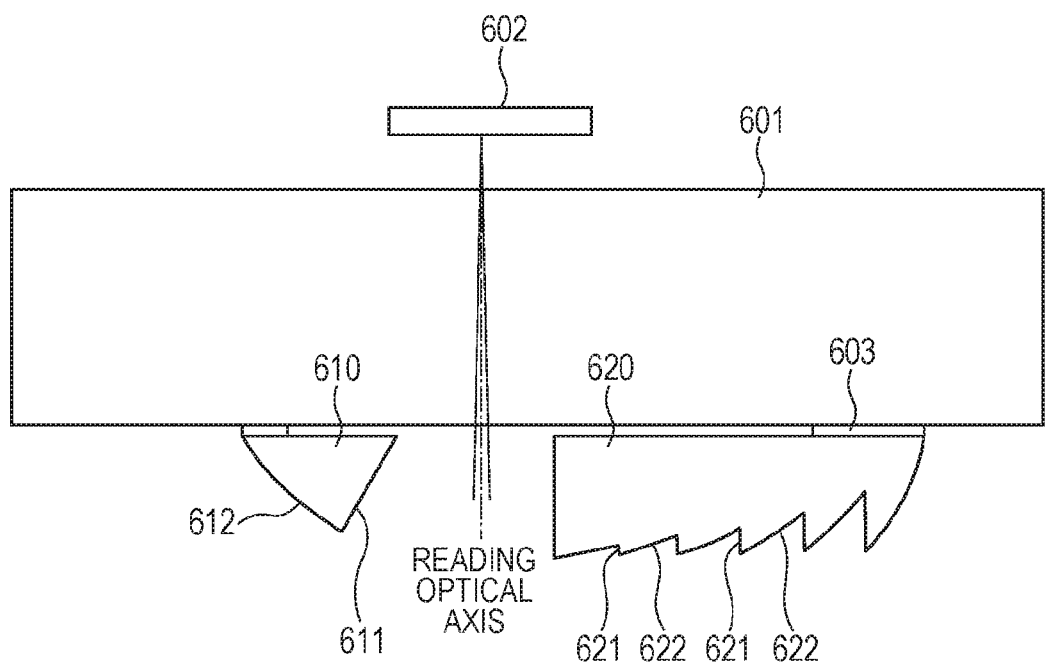
FIG. 6 is a diagram illustrating a light condensing unit of a variation example of the first embodiment.

Referring to FIG. 6, a variation example of the light condensing unit used in the first embodiment is described. The light condensing unit 610 illustrated in FIG. 6 is a prism whose wall surface 611 adjacent to the reading optical axis forms an angle of 30° with the reading optical axis, and whose wall surface 612 away from the axis is inclined and has a shape that is a segment of an arc having a diameter of 8 mm. The light condensing member 620 includes substantially arc-shaped segments of an ellipse connected to form a Fresnel lens. The ellipse as the base has a major axis with a length of 14 mm and a minor axis with a length of 10 mm. The pitch of the Fresnel lens is 1 mm. The shape of the ellipse is designed to have an appropriate angle in conformity with the characteristics of the light illuminating device which is to be used together.

These light condensing units are made of an acrylic resin (with a refractive index of approximately 1.49), and formed through injection molding. These units have substantially same lengths as the light guiding body and the opposite reflection plate in the main scanning direction (first direction), and is fixed with the double-sided adhesive tape 603 onto the feeding-reading glass 601 around the end farthest from the reading optical axis.

Figure 7B:
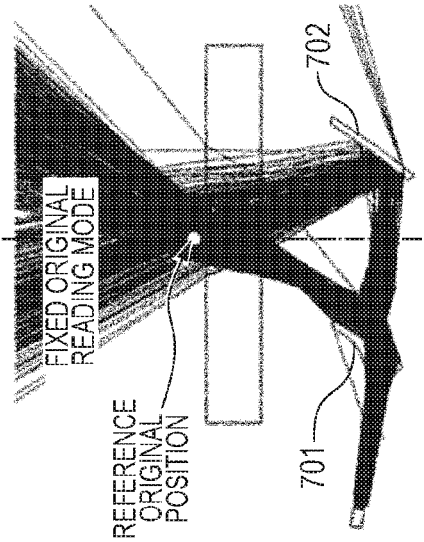
FIGS. 7A and 7B are diagrams illustrating an advantageous effect according to the variation example of the first embodiment.
Figure 7B:
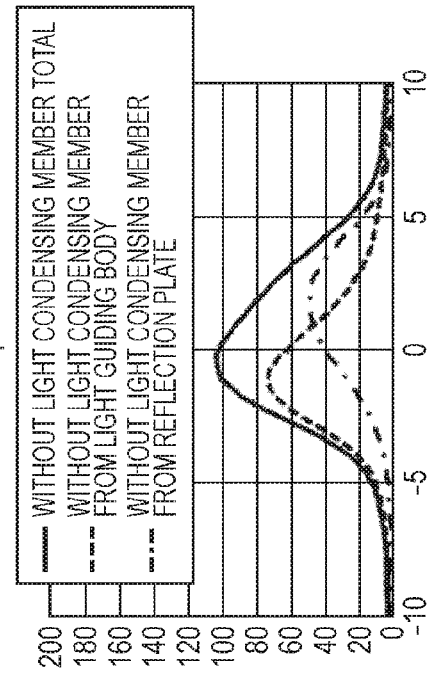
Figure 7A:
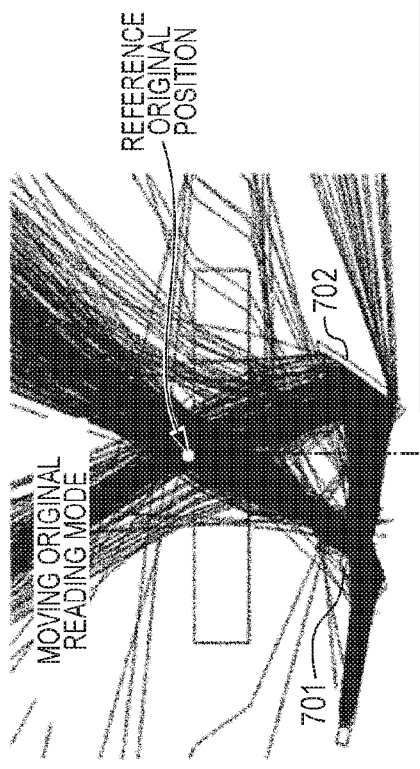
Figure 7A:
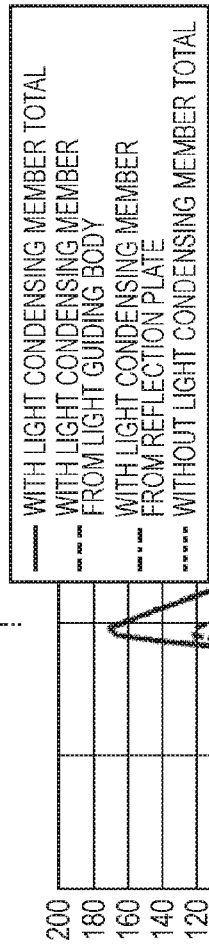

FIGS. 7A and 7B illustrate comparison between the feeding-reading (first mode) and the fixed original reading mode (second mode), in the optical path of the representative light beam, and in the distribution of the amount of light (illumination intensity) on the original. As can be understood from FIGS. 7A and 7B, the light beam from the light guiding body 701 and the opposite reflection plate 702 is refracted so as to pass in proximity to the reference original position, in the moving original reading mode (first mode), unlike the fixed original reading mode (second mode). Consequently, as with the first embodiment, at the reference original position in the moving original reading mode (first mode), increase in illumination intensity by approximately 60% is achieved in comparison with the fixed original reading mode (second mode) without the light condensing units.

In this variation example, the shape of the light condensing unit in the sub-scanning section is arc segments arranged as the Fresnel lens. However, the shape is not limited to such a shape. Any shape can be adopted only if the wall surface of each of arranged prisms away from the reading optical axis has an inclination that refracts the illumination light flux to approach the reading optical axis. The shape may be a perfect circle or a quadratic curve, and is not limited to a segment of an arc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-105270, filed May 25, 2015, which is hereby incorporated by reference herein in its entirety.

What is claimed is:

1. An image reading apparatus comprising:
   a reading unit that illuminates an original and reads an image of the original,
   wherein the apparatus can execute a first mode of reading the image of the moving original while the reading unit is kept stationary, and a second mode of reading the image of the stationary original while moving the reading unit,
   the apparatus further comprises a light condensing unit that condenses a light flux from the reading unit on the original in the first mode,
   the light flux from the reading unit incidents on the original without passing through the light condensing unit in the second mode, and
   the light condensing unit condenses the light flux in a section including a moving direction of the original and a reading optical axis direction of the reading unit.

2. The image reading apparatus according to claim 1, wherein the light condensing unit is fixed.

3. The image reading apparatus according to claim 1, wherein a condition, $$I_{O1}/I_{O2} > 1.06,$$

is satisfied where $I_{O1}$ is an illumination intensity at a reference position at which the original is arranged in the reading optical axis direction in the first mode, and $I_{O2}$ is an illumination intensity at the reference position in the second mode.

4. The image reading apparatus according to claim 1, wherein a condition, $$I_1/I_0 > 0.4,$$

is satisfied where $I_0$ is an illumination intensity at a reference position at which the original is arranged in the reading optical axis direction in the second mode, and $I_1$ is an illumination intensity at a position 10 mm apart from the reference position in the reading optical axis direction.

5. The image reading apparatus according to claim 1, wherein the light condensing unit includes a plurality of prisms that refracts the light flux.

6. The image reading apparatus according to claim 5, wherein the plurality of prisms refracts the light flux so as to approach the reading optical axis of the reading unit.

7. The image reading apparatus according to claim 6, wherein a refraction angle of the light flux with respect to a prism farthest from the reading optical axis among the plurality of prisms is larger than a refraction angle of the light flux with respect to a prism closest to the reading optical axis among the plurality of prisms.

8. The image reading apparatus according to claim 1, wherein the light condensing unit is a Fresnel lens.

9. The image reading apparatus according to claim 8, wherein a condition, $$0.5 < T < 5,$$

is satisfied where T (mm) is a thickness of the Fresnel lens in the reading optical axis direction of the reading unit.

10. The image reading apparatus according to claim 1, wherein the reading unit includes a light source, and a light guiding body that guides the light flux from the light source onto the original.

11. The image reading apparatus according to claim 10, wherein the light condensing unit is long in a first direction perpendicular to the moving direction of the original and the reading optical axis direction of the reading unit.

12. The image reading apparatus according to claim 10, wherein the reading unit includes a reflection unit that reflects a part of the light flux from the light guiding body toward the original.

13. The image reading apparatus according to claim 12, wherein the reflection unit is arranged on a side opposite to the light guiding body across the reading optical axis of the reading unit.

14. The image reading apparatus according to claim 12, further comprising first and second light condensing units as the light condensing unit,
   wherein the first light condensing unit condenses the light flux from the light guiding body, and the second light condensing unit condenses the light flux from the reflection unit, in the first mode.

15. The image reading apparatus according to claim 1, further comprising a second reading unit that reads a second surface of the original, the second surface being opposite to a first surface to be read by the reading unit, in the first mode.

16. The image reading apparatus according to claim 15, further comprising a light condensing unit that condenses the light flux from the second reading unit on the second surface of the original, in the first mode.

* * * * *